United States Patent
Chen

(10) Patent No.: US 6,802,520 B2
(45) Date of Patent: Oct. 12, 2004

(54) SEAT POST CUSHION ASSEMBLY

(76) Inventor: Chao-Hu Chen, No. 128, Da Chou Road, Shen Kang Hsiang, Taichung Hsien (TW)

( * ) Notice: Subject to any disclaimer, the term of this patent is extended or adjusted under 35 U.S.C. 154(b) by 0 days.

(21) Appl. No.: 10/357,192

(22) Filed: Feb. 4, 2003

(65) Prior Publication Data

US 2004/0150187 A1 Aug. 5, 2004

(51) Int. Cl.[7] .................................................. B62J 1/02
(52) U.S. Cl. .................... 280/275; 280/226.1; 280/283; 297/217.2
(58) Field of Search ............................ 280/220, 226.1, 280/275, 283; 267/195, 257, 292, 131, 132; 297/215.13, 217.2; 33/501

(56) References Cited

U.S. PATENT DOCUMENTS

| | | | | | |
|---|---|---|---|---|---|
| 3,664,027 A | * | 5/1972 | Fritz et al. | ..................... | 33/515 |
| 5,094,424 A | * | 3/1992 | Hartway | ..................... | 248/600 |
| 5,382,039 A | * | 1/1995 | Hawker | ..................... | 280/283 |
| 5,779,249 A | * | 7/1998 | Lin | ..................... | 280/287 |
| 5,927,738 A | * | 7/1999 | Kesinger | ..................... | 280/220 |
| 6,095,538 A | * | 8/2000 | Maret | ..................... | 280/220 |

* cited by examiner

*Primary Examiner*—Lesley D. Morris
*Assistant Examiner*—Matthew Luby

(57) ABSTRACT

A cushion assembly for seat post includes a hollow tube and a seat post is movably inserted in the hollow tube. A resilient member is inserted in the hollow tube and an end of the resilient member contacts the seat post. An adjusting member is adjustably inserted in an open end of the hollow tube and contacts the other end of the resilient member. The resilient member can be adjusted its compression by rotating the adjusting member.

5 Claims, 7 Drawing Sheets

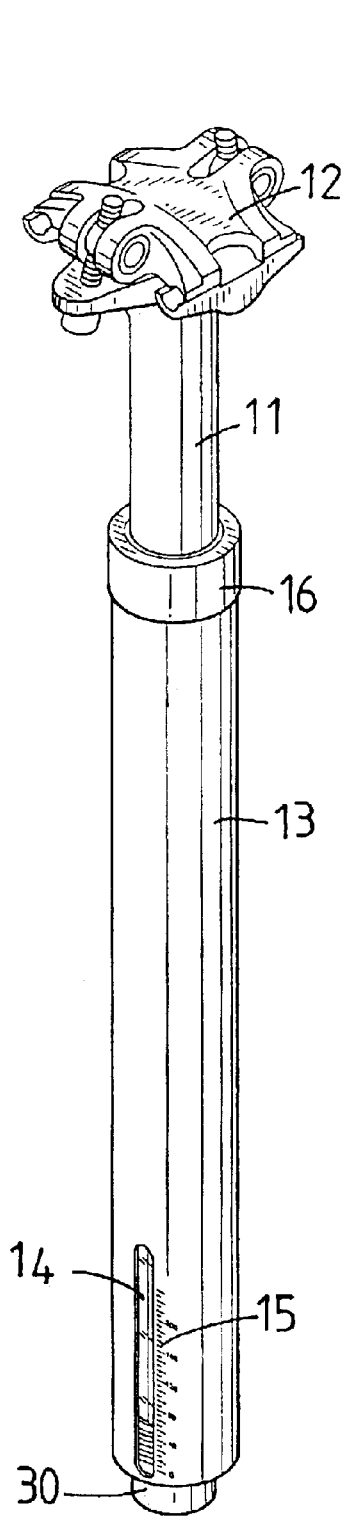
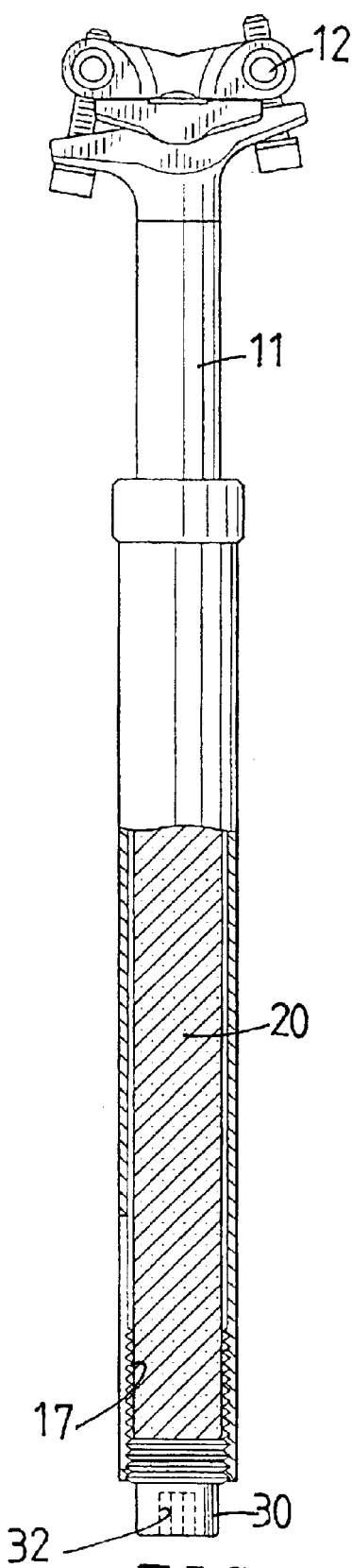
FIG. 2
FIG. 3

SEAT POST CUSHION ASSEMBLY

FIELD OF THE INVENTION

The present invention relates to a seat post cushion assembly that includes a resilient member received in a hollow tube in which the seat post is inserted. An adjusting member is threadedly connected to the lower end of the hollow tube.

BACKGROUND OF THE INVENTION

A conventional seat post is inserted into the seat tube of a bicycle frame and clamped by fastening a top end of the seat tube. The seat post and the seat tube are connected as one-piece so that there is no cushion function provided for the rider. Shocks are transferred to the rider directly from the solid combination of the seat tube and the seat post. A latest cushion assembly for the seat post uses a spring received in the seat tube and the seat post is engaged with the spring so that the load of the rider compresses the spring when the bicycle is ridden on a rugged road. By the deformation of the spring in the seat tube, the rider feels better for the shocks are absorbed by the spring. Nevertheless, the action of the spring cannot be adjusted so that the cushion assembly may not be satisfied by different users.

The present invention intends to provide a cushion assembly for seat post and the cushion assembly can be adjusted according individual needs.

SUMMARY OF THE INVENTION

In accordance with one aspect of the present invention, there is provided a seat post cushion assembly which comprises a hollow tube having a first open end and a second open end. A seat post is inserted in the hollow tube from the first open end and a resilient member is inserted in the hollow tube from the second open end of the hollow tube. A first end of the resilient member contacts the seat post and an adjusting member is adjustably inserted in the second open end of the hollow tube and contacts a second end of the resilient member.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 is a perspective view to show the cushion assembly with the seat post inserted in the hollow tube;

FIG. 3 is a cross sectional view to show the cushion assembly of the present invention;

DETAILED DESCRIPTION OF THE PREFERRED EMBODIMENT

Figure 1:
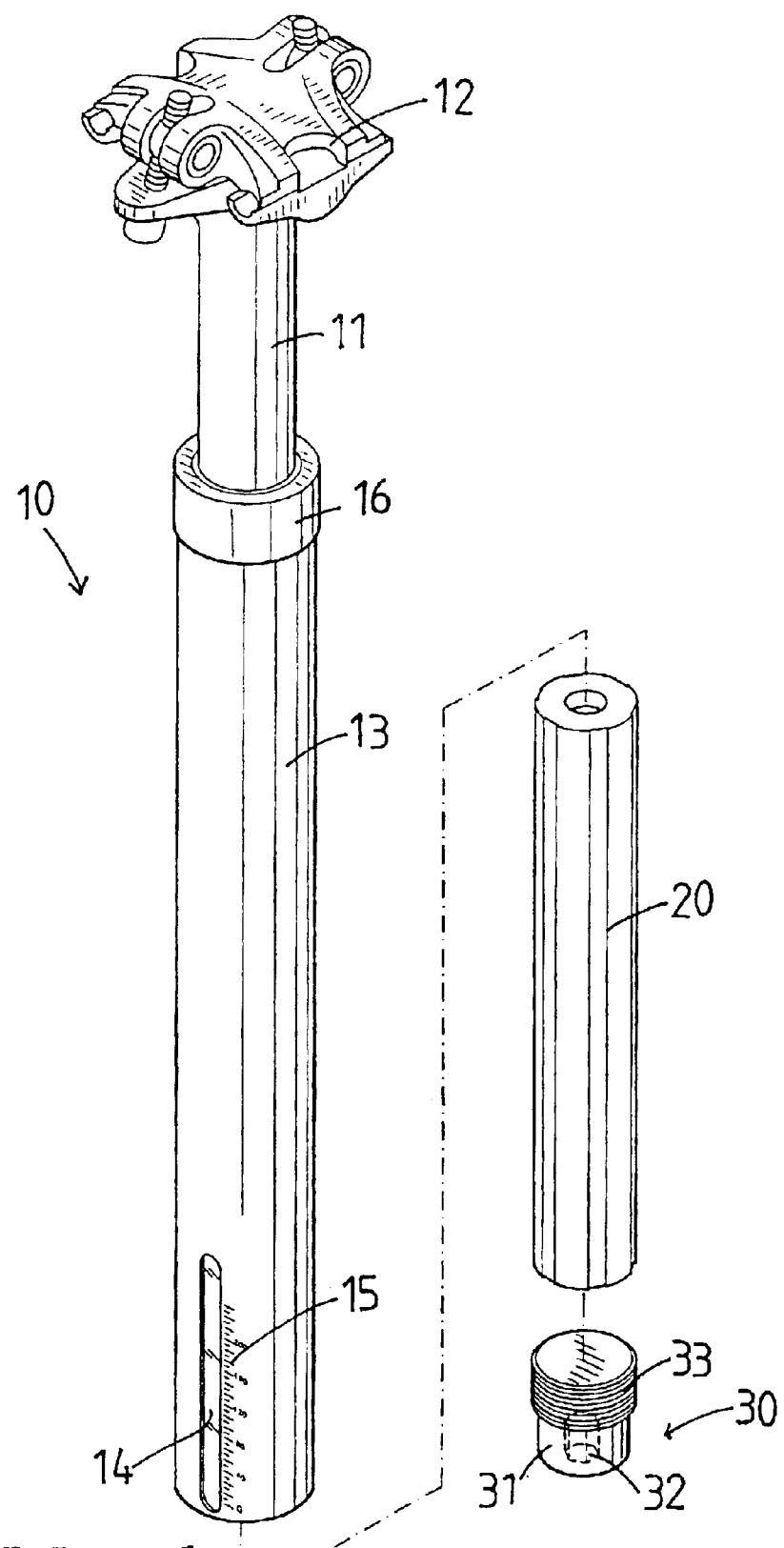
FIG. 1 is an exploded view to show the cushion assembly of the present invention.

Referring to FIGS. 1 to 3, the cushion assembly 10 for seat post of the present invention comprises a hollow tube 13 that has a first open end and a second open end. A seat post 11 is inserted in the hollow tube 13 from the first open end. A seat clamp mechanism 12 is connected to a distal end of the seat post 11 so as to connect a seat on the seat clamp mechanism 12. A nut 16 is used to properly clamp the first open end of the hollow tube 13.

Figure 4:
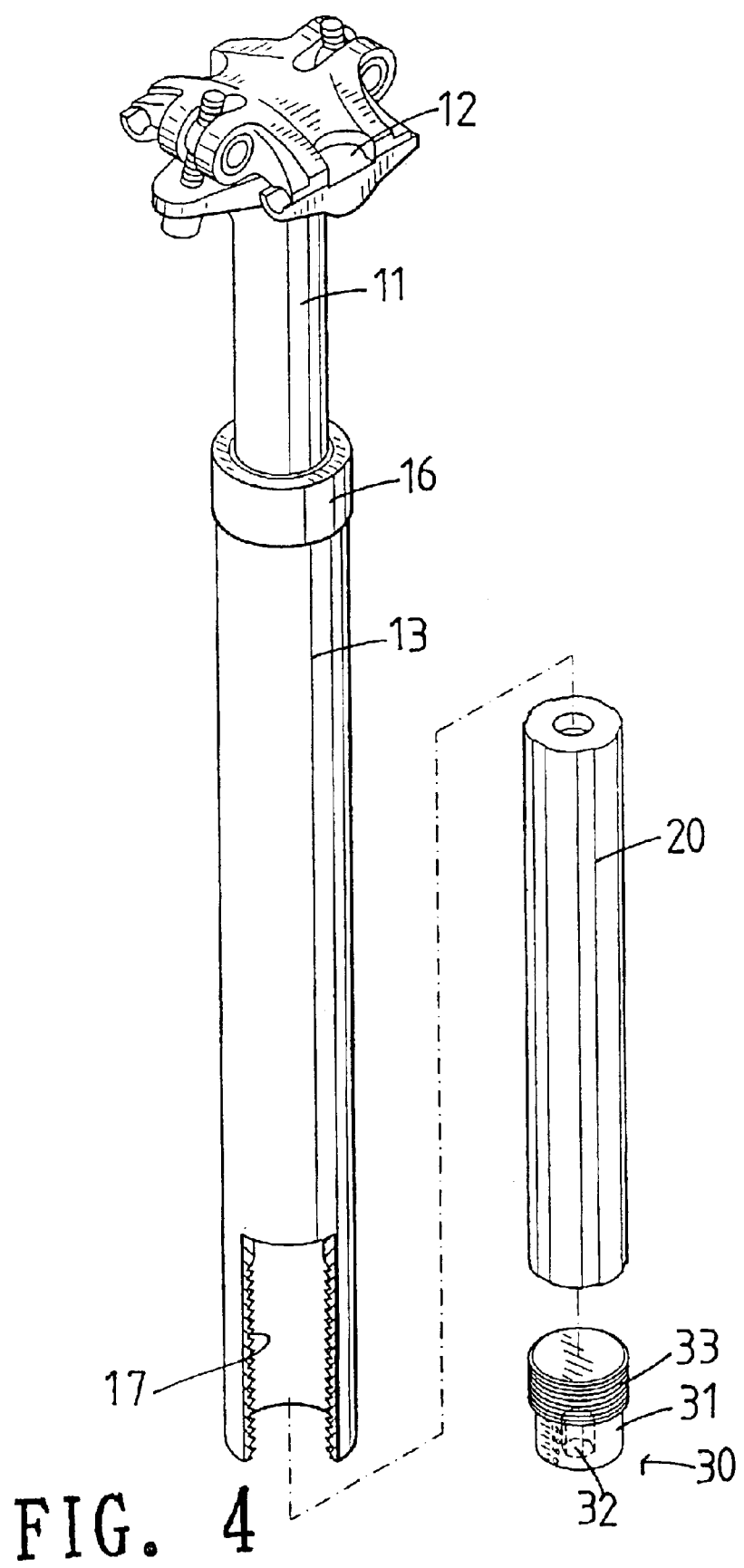
FIG. 4 shows that the adjusting member is threadedly connected to the second open end of the hollow tube and scale is marked on the shank of the adjusting member.
Figure 5:
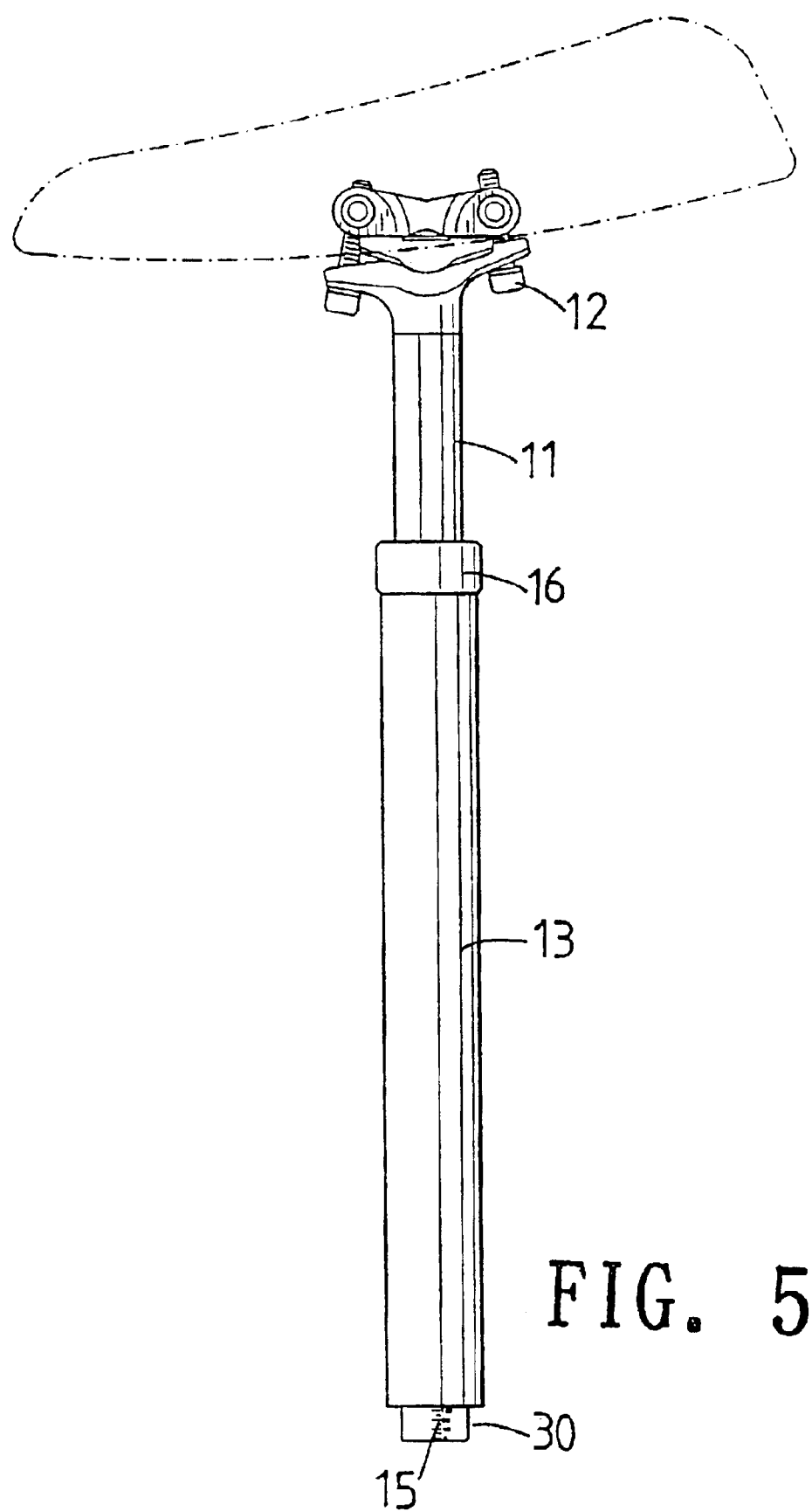
FIG. 5 is a perspective view to show the cushion assembly as shown in FIG. 4.

A resilient member 20 such as an elastic rubber is inserted in the hollow tube 13 from the second open end of the hollow tube 13 and a first end of the resilient member 20 contacts the seat post 11. The hollow tube 13 has a window 14 defined through a wall thereof and scales 15 are marked on an outside of the hollow tube 13 so that the user may check the adjustment of the seat post 11 by reading the scales 15. The second open end of the hollow tube 13 includes an inner threaded section 17 as shown in FIG. 4.

Figures 7, 8:
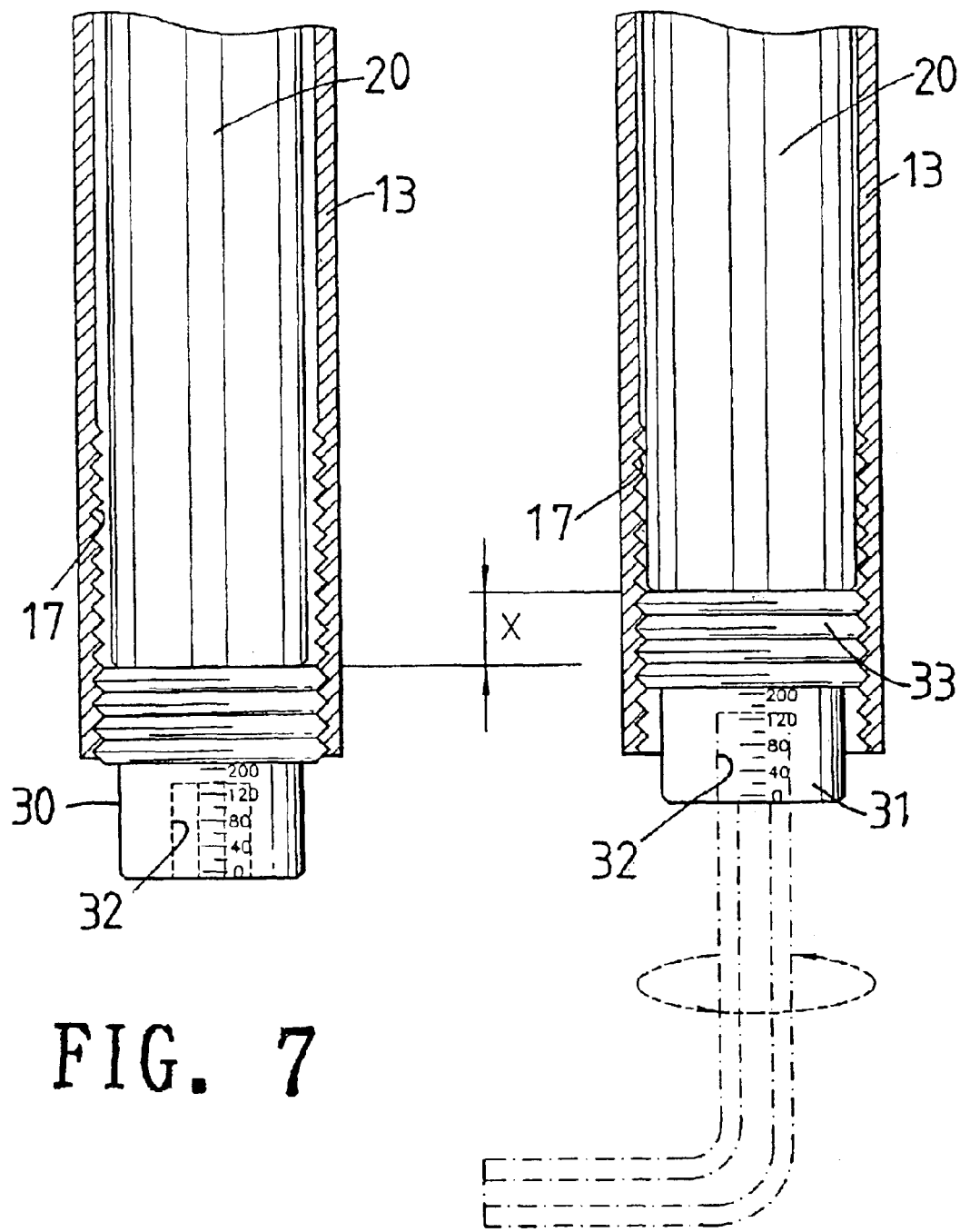
FIG. 7 is an enlarged cross section to show the adjusting member and the hollow tube of the cushion assembly as shown in FIG. 4.
FIG. 8 shows the adjusting member is rotated by using a wrench.
Figure 9:
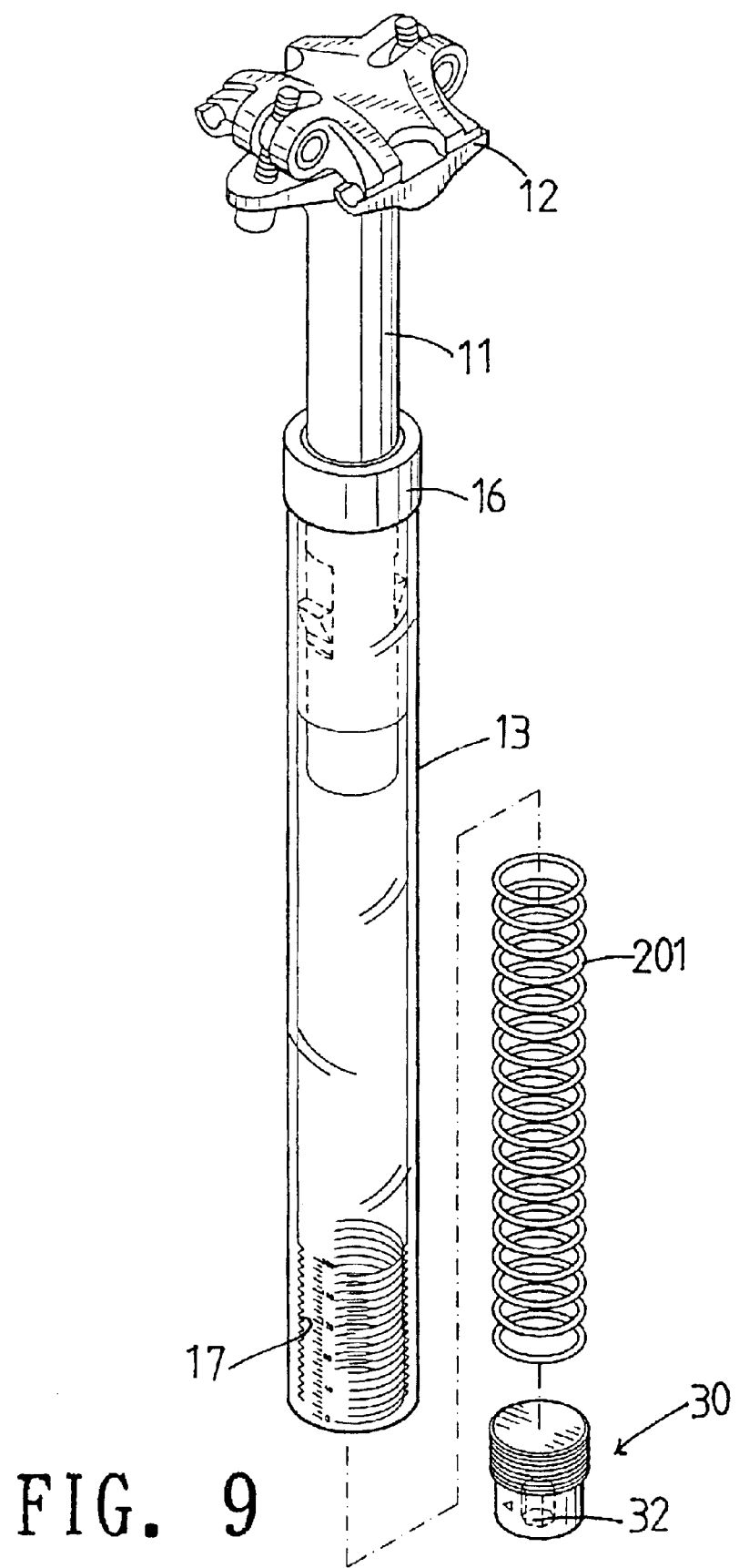
FIG. 9 shows that the resilient member can be a spring.

An adjusting member 30 is adjustably inserted in the second open end of the hollow tube 13 and contacts a second end of the resilient member 20. The adjusting member 30 includes a threaded section 33 and a shank 31. The threaded section 33 is engaged with the threaded section 33 of the adjusting member 30. A polygonal hole 32 is defined in the adjusting member 30 so that the adjusting member 30 can be rotated by using a tool such as a wrench as shown in FIG. 8 and the resilient member 20 is then adjusted.

Referring to FIGS. 4 to 8, the adjusting member 30 has scales marked on a shank 31 thereof and the shank of the adjusting member 30 is exposed out from the second open end of the hollow tube 13. Therefore, the adjustment can be checked by reading the scales on the shank 31 of the adjusting member 30 when using a wrench to rotate the adjusting member 30.

Figure 6:
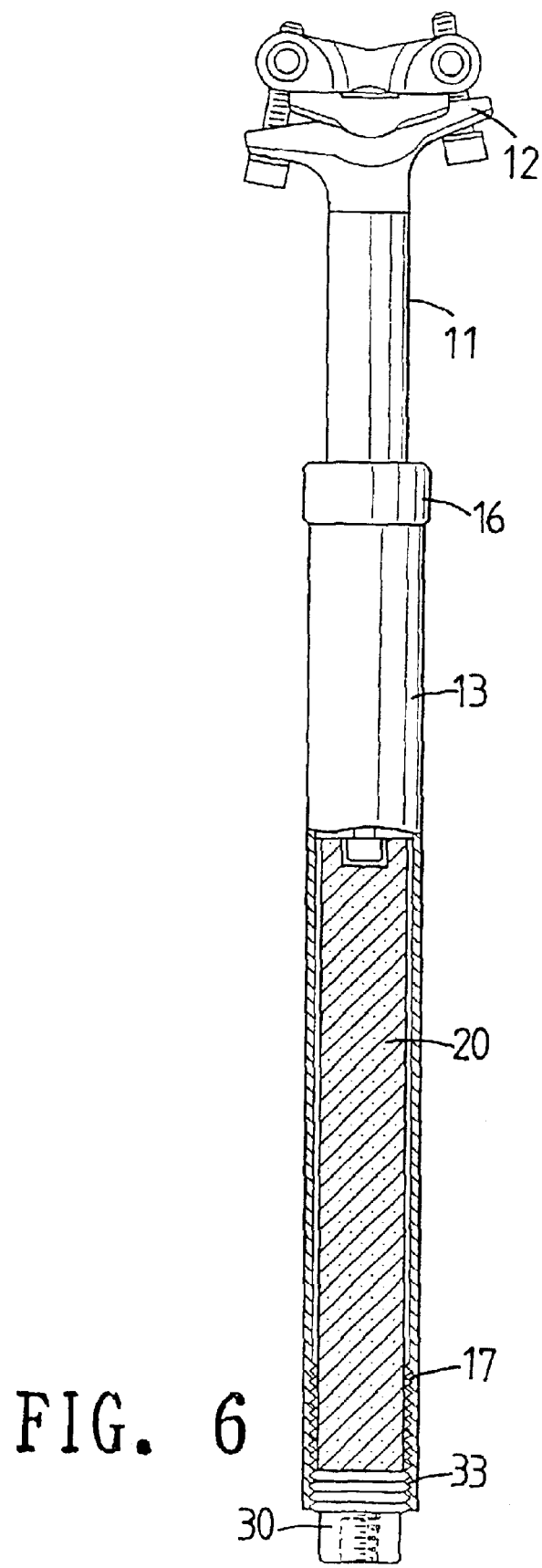
FIG. 6 is a cross sectional view to show the cushion assembly as shown in FIG. 4.

FIG. 6 shows that the resilient member 20 can be replaced with a spring 201.

While we have shown and described the embodiment in accordance with the present invention, it should be clear to those skilled in the art that further embodiments may be made without departing from the scope of the present invention.

What is claimed is:

1. A seat post cushion assembly comprising:

a hollow tube having a first open end and a second open end, a seat post inserted in the hollow tube from the first open end, a resilient member inserted in the hollow tube from the second open end of the hollow tube and a first end of the resilient member contacting the seat post, and an adjusting member adjustably inserted in the second open end of the hollow tube and contacting a second end of the resilient member, the adjusting member having scales marked on a shank thereof and the shank of the adjusting member is exposed out from the second open end of the hollow tube.

2. The assembly as claimed in claim 1, wherein the resilient member is an elastic rubber.

3. The assembly as claimed in claim 1, wherein the adjusting member includes a polygonal hole defined therein.

4. The assembly as claimed in claim 1 wherein the hollow tube has a window defined through a wall thereof.

5. The assembly as claimed in claim 1, wherein the adjusting member includes a threaded section and the second open end of the hollow tube includes an inner threaded section which is engaged with the threaded section of the adjusted member.

* * * * *